June 3, 1930.  B. CURRLIN  1,761,519
TRAFFIC SIGNAL
Filed June 5, 1923   2 Sheets-Sheet 1
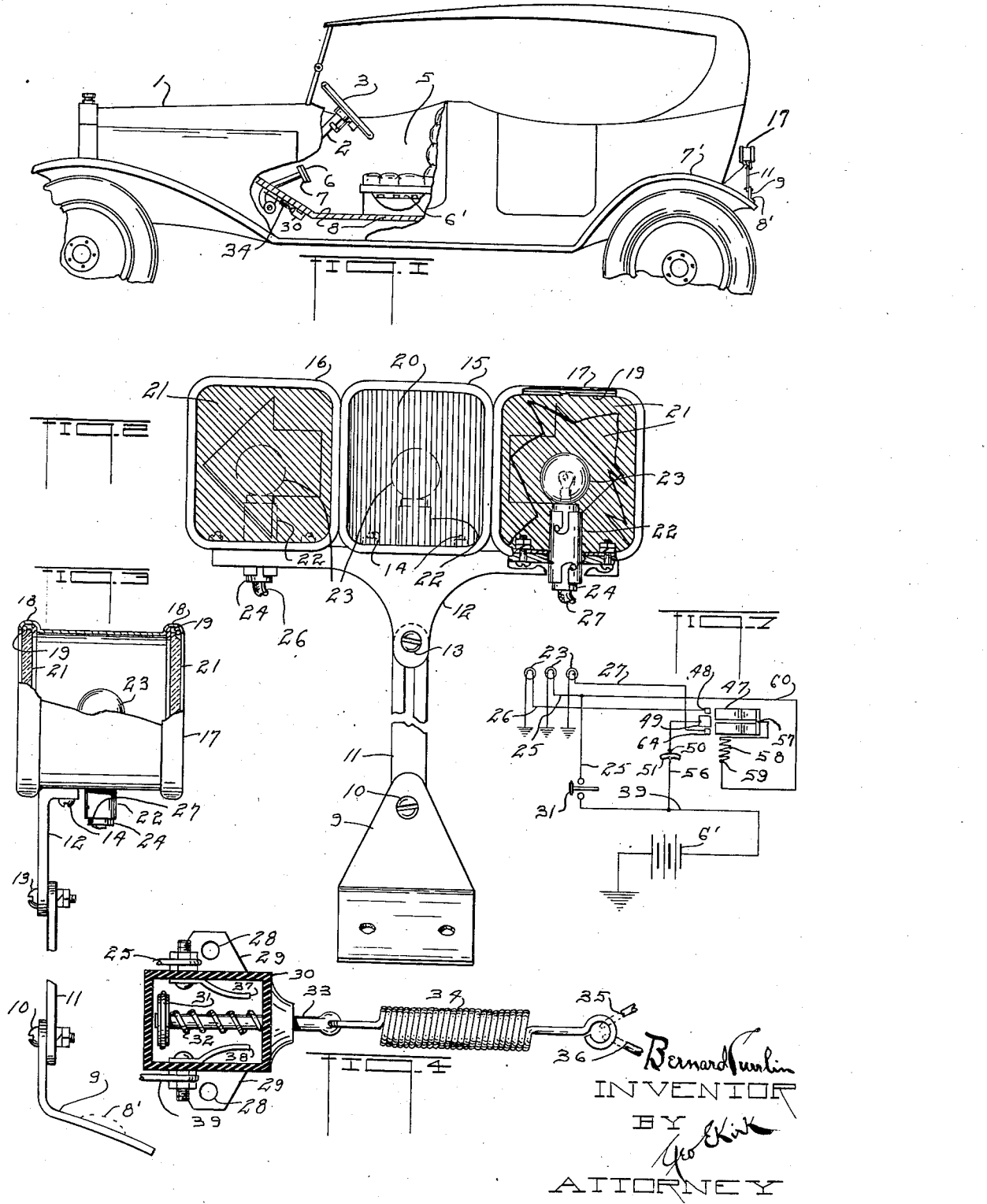

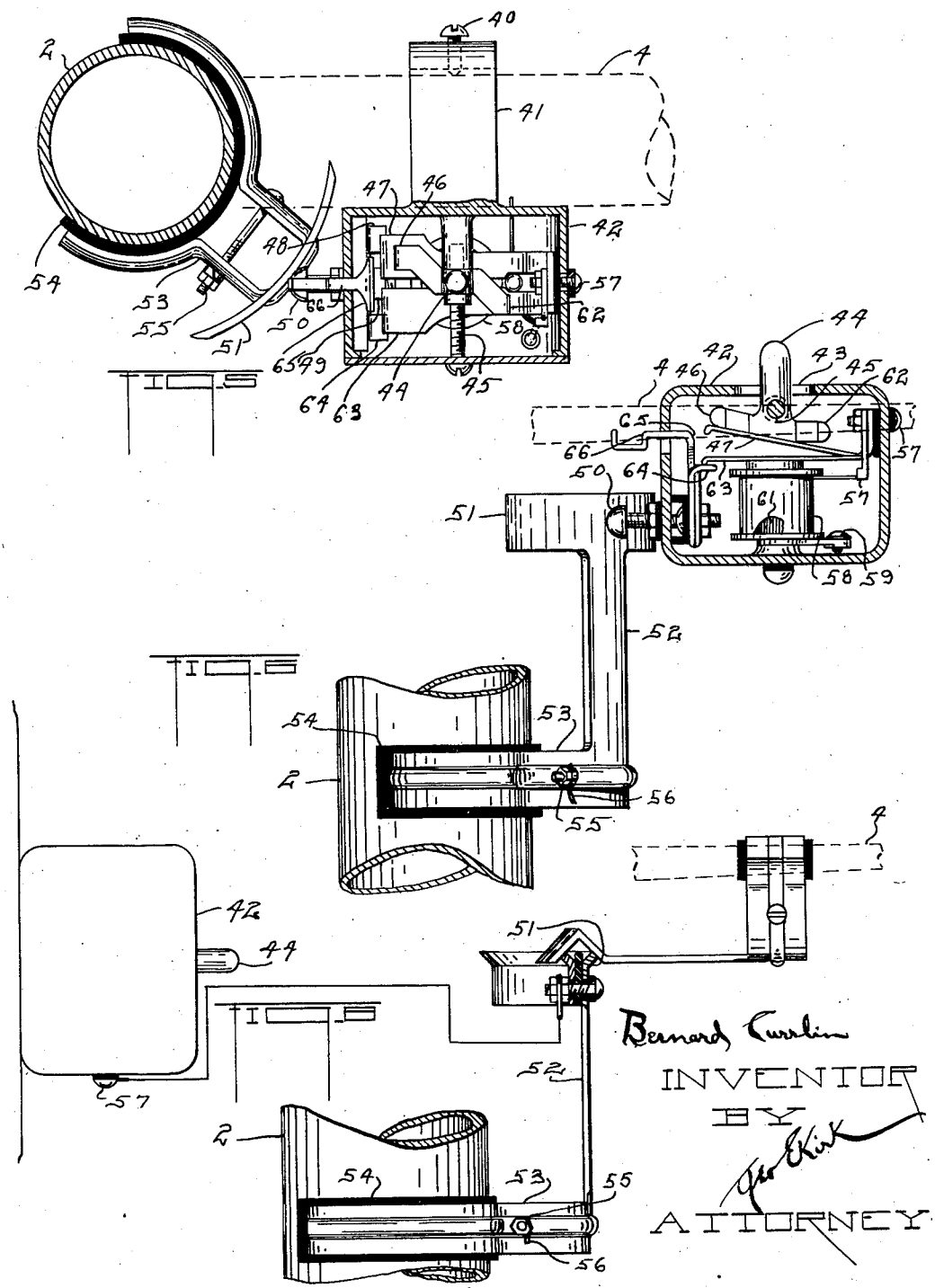

Patented June 3, 1930

1,761,519

UNITED STATES PATENT OFFICE

BERNARD CURRLIN, OF TOLEDO, OHIO

TRAFFIC SIGNAL

Application filed June 5, 1923. Serial No. 643,515.

This invention relates to traffic signals, more especially of the type to be electrically controlled.

This invention has utility when incorporated in visible signals for indicating direction, speed or location of a vehicle.

Referring to the drawings:

Fig. 1 is a fragmentary view of a motor vehicle having incorporated therewith an embodiment of the invention;

Fig. 2 is a detail view, on an enlarged scale of the display portion of the signal as carried by the fender in Fig. 1;

Fig. 3 is a fragmentary side view of the device of Fig. 2;

Fig. 4 is a detail view of the pedal control switch;

Fig. 5 is a plan of additional control switches as carried from the steering column;

Fig. 6 is a side elevation, with parts broken away, of the switches at the steering column;

Fig. 7 is a wiring diagram; and

Fig. 8 is a fragmentary view of an installation wherein provision is made for steering wheel cut-out even though the cut-in for direction be carried elsewhere, as on the dash or control board.

Motor vehicle 1 is provided with steering column 2 surmounted with steering wheel 3 having spider or spoke arms 4. At the driver's station 5 adjacent the steering wheel, there is provided brake pedal 6 and clutch pedal 7 protruding upward from floor board 8. Beneath the driver's station or seat 5 is battery 6'.

On rear left fender 7' by means of bolts 8' is mounted bracket 9 having upwardly extending portion with which may be fixed by bolt 10 an arm 11. This arm 11 in its adjustable direction position extends to main support 12 extending transversely of the fender 7. This arm 11 is connected to this support 12 by bolt 13. Bolts 14 anchor central housing section 15, and terminal housing sections 16, 17, with this support 12. These housing sections are similar, terminating forwardly and rearwardly in seats 18 for spring rings 19 to coact with red lens 20 in the forward and rear portions of the housing section 15. The rings 19, as coacting with the seats 18 of the housing sections 16, 17, mount lenses 21 in the respective seats 18. These lenses 21, each disclose a green arrow head directed away from the housing section 15, as direction disclosing means, while the lens 20 may be used as a location or speed disclosing means. These housing sections 15, 16, 17, as herein disclosed are of tubular form, drawn or stamped from sheet metal, and compacted for snug assembly, by slightly squaring or giving a somewhat rectangular cross-section to the tubular members 15, 16, 17.

From the lower side, each of these housing sections has mounted therein a socket 22 for disposing centrally in such housing section incandescent electric light bulb 23. These sockets 22 are of double form, the outer or lower ends receiving plugs 24 for conductor lines 25, 26, 27, respectively. The opposite sides or terminals of the sockets ground with the support 12 and therethrough with the car 1.

Beneath the footboard or floorboard 8, or some other convenient location bolts through openings 28 in ears 29 from insulation box 30, may mount this box 30 so that plunger 31, therein as normally thrown by helical compression spring 32, may have its protruding stem 33 connected to tension helical spring 34 having connections 35, 36, to the brake pedal lever 6 and the clutch pedal lever 7. Accordingly, as either pedal is thrust forward, there is a pull on the spring 34, tending to compress the spring 32 in the box 30, and draw the plunger 31 between terminals 37, 38, to connect the line 25 from the central housing section 15 to line 39 extending to the battery 6'. Thus, as either clutch or brake pedal is thrown, the lamp 23 in the housing section 15 is luminous to display red through the lenses 20, both front and rearward, as an indication that a change of speed is being made by the driver at station 5. At once the situation is resumed in which both pedals 6, 7, are released, the spring 32 thrusts the plunger 31 clear of the terminals 37, 38, and the housing 15 is darkened.

At the steering wheel 3, set screw 40, from overhanging arm 41 or box 42, anchors this box with spider arm 4 of the steering wheel 3. This box 42 in its upper side has slot 43 through which protrudes handle 44 carried by pivot pin 45. Rocked toward the column 2, this handle 44, is effective through offset shoe portion 46 (Fig. 5), to depress spring steel arm 47 into contact with terminals 48, 49. The terminal 49 has contact 50, which in a central range of direction travel for the vehicle as controlled by the steering wheel 3, engages shoe 51, held against the contact 50 by spring arm 52 mounted by clamp 53 upon the column 2 and insulated therefrom by insulation 54. This clamp 53 is anchored by bolt 55, serving as a terminal for wire 56 from the battery 6'. This direction indication throwing of the handle 44 accordingly becomes effective for signal display, through the arm 47 closing circuit from the battery 6', to terminal 57, to pass thence through coil 58, terminal 59, and line 60 to the line 25, for lighting up the bulb 23 in the central housing 15 for red display from the lenses 20. The energizing of the coil 58 renders its core 61 effective for holding the arm 47 depressed notwithstanding the driver of the vehicle may only tilt the handle 44 for a brief interval. The line 26 extends to the terminal 48, and accordingly simultaneously with this central red light display from the housing 15, the green arrow in the housing 16, both front and rear, is illuminated by its bulb 23, to give visible indication that the driver contemplates turning to the right, notwithstanding the vehicle is at rest, or is still running straight ahead. As the steering wheel 3 is turned as to the column 2 in effecting the elected turning, the contact 50 rides off the shoe 51, and the circuit to the coil or solenoid 58 is broken, the magnet de-energized, both red and green lights being cut-out so far as the steering post control switches. This release for automatic resetting occurs without any attention whatsoever upon the part of the driver.

If the direction of travel be to the left, opposite tilting of the handle 44, brings shoe portion 62 (Fig. 5) oppositely offset from the shoe portion 46, against spring magnetizable metal arm 63 thereby thrown downward to contact with the terminal 49, and terminal 64, to which the line 27 from the housing 17 extends. This means that there is energizing of the solenoid 58 with lighting up of the red housing 15 and the left direction pointing green arrows in the housing section 17. As the driver effects such direction turning of the steering wheel 3, the contact 50 rides off the opposite end of the shoe 51 from the other turning direction; and as such riding off occurs, the lights are out and the parts are reset automatically for the subsequent signalling operation.

It is thus seen there are two modes of lighting the bulb 23 in the housing 15. Herein there is provided a third way of lighting such bulb 23 in the housing 15—for parking purposes. From the terminal 49 rises a spring arm 65, with a narrow outwardly extending catch portion 66 protruding from the housing 42. By forcing the portion 66 into the housing 42 to have the catch portion thereof engage with such housing, the broadened top portion 65 of the spring arm connects the terminal 49 with the spring arms 47, 63, independently of such arms closing circuit with either terminal 48 or 64. In fact this arm 65 so holds the arms 47, 63, that direction signals in the housings 16, 17, may not be operated, but the red light housing 15 is illuminated, say for use as a parking signal when the vehicle is at rest. To re-establish the installation for traffic direction and speed uses, the catch portion 66 is freed to spring out of the housing 42, extinguishing the light in the housing section 15. This means the driver must cut out parking use before he may use traffic signals and so thus avoid mixing signals.

The degree of visibility of the green is not so great as with red. As green is a simple distinguishing color for direction indication, its importance as a warning may be less liable to being ignored, when the direction green is accompanied by the warning red, as herein. In a compact structure, there is thus disclosed a full range of traffic signals. The red will be disclosed at a turn whether or not there be brake or clutch operation, and such multiple cut-in workings do not disturb the controls as set forth.

What is claimed and it is desired to secure by Letters Patent is:

1. In a vehicle signalling system; a stop signal; a direction signal; a signal controlling switch comprising a depressible contactor of magnetic material; a stationary and a movable, but normally stationary, contact arranged to be engaged by the depressible contactor; electro-magnetic means supported in operative relation with the depressible contactor; means for moving one of the contacts into engagement with the depressible contactor in its normally open position, and means for locking the contact thus moved, in its moved position whereby the stop signal may be separately and continuously illuminated; a switch connected with the steering mechanism of the vehicle arranged to be closed when the vehicle is steered in a forward direction and opened when the vehicle is steered in either turning direction; a source of current and connecting means between said source, the signal and the switches, whereby a stop and direction signal is illuminated upon the depression of the depressible contactor remains illuminated through the magnetic interaction of the depressible contactor and the electro-magnetic means, until the circuit is interrupted through the opening of the steering wheel operated switch.

2. In a vehicle signalling system; a stop light; two direction signals; a pedal operated switch to illuminate the stop light; a direction signal controlling switch comprising two depressible contactors of magnetic material; two stationary and one movable, but normally stationary, contacts arranged to be engaged by the depressible contactors; electromagnetic means supported in operative relation with the depressible contactors; means for moving one of the contacts into engagement with the depressible contactors in their normally open position, and means for locking the contact thus moved, in its moved position; a switch connected with the steering mechanism of the vehicle arranged to be closed when the vehicle is steered in a forward direction and opened when the vehicle is steered in either turning direction; a source of current and connecting means between said source, the signals and the switches, whereby the stop light is illuminated upon normal actuation of the pedal; the stop light and a direction signal illuminated upon the depression of either of the depressible contact members, said stop and direction signals remaining illuminated through the magnetic interaction of the depressible members and the electro-magnetic means, until the circuit is interrupted through the opening of the steering wheel operated switch, and whereby the stop signal may be separately and continuously illuminated by locking the movable contact into engagement with the depressible contacts.

In witness whereof I affix my signature.

BERNARD CURRLIN.